United States Patent
Cheng

(10) Patent No.: US 9,538,611 B2
(45) Date of Patent: Jan. 3, 2017

(54) SENSOR WITH LUX OFF FUNCTION AND METHOD FOR SWITCHING OFF

(71) Applicant: HYTRONIK ELECTRONICS CO., LTD, Shenzhen, Guangdong (CN)

(72) Inventor: Yabing Cheng, Shenzhen (CN)

(73) Assignee: HYTRONIK ELECTRONICS CO., LTD, Shenzhen (CN)

(*) Notice: Subject to any disclaimer, the term of this patent is extended or adjusted under 35 U.S.C. 154(b) by 0 days.

(21) Appl. No.: 14/703,931

(22) Filed: May 5, 2015

(65) Prior Publication Data
US 2015/0366034 A1 Dec. 17, 2015

Related U.S. Application Data

(63) Continuation-in-part of application No. PCT/CN2014/085467, filed on Aug. 29, 2014.

(30) Foreign Application Priority Data

Jun. 17, 2014 (CN) ...................... 2014 2 0324106 U

(51) Int. Cl.
*H05B 37/02* (2006.01)
(52) U.S. Cl.
CPC ................ *H05B 37/0218* (2013.01)

(58) Field of Classification Search
CPC . H05B 37/02; H05B 37/0209; H05B 37/0218; H05B 33/08; H05B 33/0854; H05B 33/0824; H05B 33/0848; H05B 33/0845
USPC ............... 315/149, 150, 159, 291, 297, 307
See application file for complete search history.

(56) References Cited

U.S. PATENT DOCUMENTS

| | | | | |
|---|---|---|---|---|
| 7,828,463 B1* | 11/2010 | Willis | ...................... | F21S 8/086 362/153.1 |
| 7,965,048 B2* | 6/2011 | Lin | ...................... | H05B 33/0854 315/127 |
| 2014/0117856 A1* | 5/2014 | Cho | ...................... | H05B 37/0281 315/149 |
| 2015/0108901 A1* | 4/2015 | Greene | ............. | H05B 37/0218 315/149 |
| 2016/0192458 A1* | 6/2016 | Keith | ................. | H05B 37/0209 315/291 |
| 2016/0198546 A1* | 7/2016 | Chen | ................. | H05B 37/0272 315/159 |

* cited by examiner

*Primary Examiner* — Thai Pham

(57) ABSTRACT

The present invention provides a sensor with a LUX off function and a method for switching off, and is applicable to the field of lighting control technologies. The sensor includes: a brightness detection module, a sensor module, an MCU control module and a drive module. In the present invention, a function of automatically switching off a load driving lamp is implemented, and energy consumption is effectively reduced.

10 Claims, 2 Drawing Sheets

SENSOR WITH LUX OFF FUNCTION AND METHOD FOR SWITCHING OFF

CROSS REFERENCE TO RELATED APPLICATIONS

The present application is a Continuation-in-part Application of PCT application No. PCT/CN2014/085467 filed on Aug. 29, 2014, which claims the benefit of Chinese Patent Application No. 201420324106.2 filed on Jun. 17, 2014. All the above are hereby incorporated by reference.

BACKGROUND

Technical Field

The present invention belongs to the field of lighting control technologies, and in particular relates to a sensor with a LUX off function and a method for switching off.

Related Art

At present, most microwave sensors are used by a built-in lamp. A lamp light value of the lamp is a variable, which affects brightness detection of the microwave sensors differently. At dawn, an actual ambient LUX value is lower than a preset LUX value of a common microwave sensor, and the lamp is triggered to be switched on when somebody passes by at the moment. Because there is no LUX off function, when people keep passing by during a delay time, the delay time is refreshed constantly to keep the lamp on, and even though the external natural light is very bright, the load lamp is not switched off. In this way, energy is wasted.

SUMMARY

Embodiments of the present invention provides a sensor with a LUX off function and a method for switching off, which aims to solve the problem that when an existing sensor triggers to switch on a load lamp, the load lamp is triggered to be switched on by a cumulative delay, and energy is wasted.

In one aspect, a sensor with a LUX off function is provided, and the sensor includes: a brightness detection module, a sensor module, an MCU control module and a drive module, where an output end of the brightness detection module is connected to an input end of the MCU control module, an output end of the sensor module is connected to the input end of the MCU control module, an output end of the MCU control module is connected to an input end of the drive module, and when the sensor module senses an obstacle, the MCU control module acquires, according to the brightness detection module, an ambient brightness value detected after a lamp is switched on, an ambient brightness value detected before a lamp is switched on, and a preset LUX value, calculates a switching-off LUX value automatically, and controls, according to the switching-off LUX value, the drive module to switch off a load lamp.

In another aspect, a method for switching off is provided, and the method includes:

when a sensor module senses an obstacle, acquiring, by an MCU control module according to a brightness detection module, an ambient brightness value detected after a lamp is switched on, an ambient brightness value detected before a lamp is switched on, and a preset LUX value;

calculating a switching-off LUX value by using the ambient brightness value detected after the lamp is switched on, the ambient brightness value detected before the lamp is switched on and the preset LUX value; and controlling, according to the switching-off LUX value, a drive module to switch off a load lamp.

In the embodiments of the present invention, a switching-off LUX point is set automatically according to brightness detection, and a function of automatically switching off a load driving lamp is implemented, and energy consumption is effectively reduced.

DETAILED DESCRIPTION

In order to make the objectives, technical solutions and advantages of the present invention clearer, the present invention is further described below in detail with reference to the accompanying drawings and embodiments. It should be understood that specific embodiments described herein are only used to explain the present invention, but not used to limit the present invention.

Implementation of the present invention is described below in detail with reference to the specific embodiments.

Embodiment 1

Figure 1:
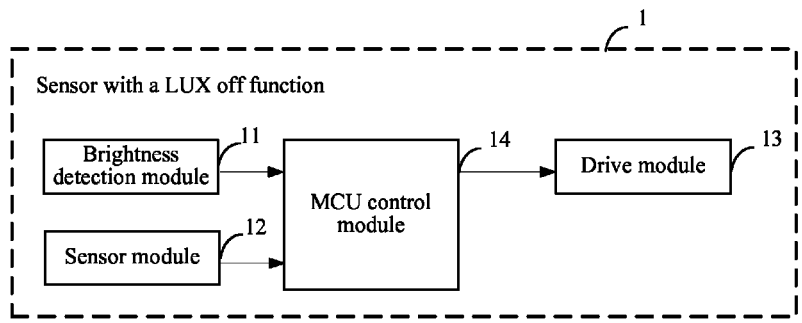
FIG. 1 is a block diagram of a specific structure of a sensor with a LUX off function according to Embodiment 1 of the present invention.

FIG. 1 is a block diagram of a specific structure of a sensor with a LUX off function according to Embodiment 1 of the present invention, and for ease of description, only parts related to this embodiment of the present invention are showed. In this embodiment, the sensor 1 with a LUX off function includes: a brightness detection module 11, a sensor module 12, a drive module 13 and an MCU control module 14, where an output end of the brightness detection module 11 is connected to an input end of the MCU control module 14, an output end of the sensor module 12 is connected to the input end of the MCU control module 14, an output end of the MCU control module 14 is connected to an input end of the drive module 13, and when the sensor module 12 senses an obstacle, the MCU control module 14 acquires, according to the brightness detection module 11, an ambient brightness value detected after a lamp is switched on, an ambient brightness value detected before a lamp is switched on, and a preset LUX value, calculates a switching-off LUX value automatically, and controls, according to the switching-off LUX value, the drive module 13 to switch off a load lamp. Specifically, the sensor module 12 is specifically any one of a microwave sensor, an infrared sensor and an acoustic wave sensor.

Further, the preset LUX value is specifically an ambient brightness switching-on value preset by using a DIP switch or a rotary switch.

Further, the brightness detection module 11 is formed by a light sensitive device, and configured to convert an optical signal to an analog electrical signal, and output the analog electrical signal to an A/D input port of the MCU control module, and the light sensitive device includes a photodiode, a phototriode, or an optical resistor.

The brightness detection module is formed by a light sensitive device such as a photodiode, a phototriode, or an optical resistor. A bleeder circuit or an amplification circuit converts the optical signal to the analog electrical signal, and outputs the analog electrical signal to the A/D input port of the MCU control module. The MCU control module 14 automatically calculates a change value of brightness, and controls, by using an instruction, the drive module 13 to switch off the load lamp.

Further, there are three manners for the MCU control module 14 to acquire the switching-off LUX value.

A first manner is: acquiring, according to the brightness detection module 11, the ambient brightness value detected after the lamp is switched on, the ambient brightness value detected before the lamp is switched on, the preset LUX value, and a fixed compensation LUX value, acquiring the switching-off LUX value, and controlling, according to the switching-off LUX value, the drive module 13 to switch off the load lamp, where the switching-off LUX value=preset LUX value+lamp light value+fixed compensation LUX value, and the lamp light value is a difference value between the ambient brightness value detected after the lamp is switched on and the ambient brightness value detected before the lamp is switched on.

Specifically, the fixed compensation LUX value is used to enable a hysteresis between the switching-off LUX value and a switching-on LUX value, so as to prevent change of the natural light from affecting determining a critical point of the switching-on LUX value. If a street lamp or a corridor lamp in a large community installs the sensor with a LUX off function, a preset LUX switching-on value of the sensor is 100 LUX, a lamp light value of the street lamp at standby 10% brightness is 500 LUX, and a compensation LUX value may specifically be 20 LUX, the MCU control module automatically calculates, according to the following formula, that the switching-off LUX value is 620 LUX=100 LUX+500 LUX+20 LUX. From night to day, when the external natural light becomes brighter and is greater than 120 LUX, the sensor with a LUX off function starts a LUX off function and switches off the load lamp automatically, thereby reducing energy consumption.

A second manner is: acquiring, according to the brightness detection module 11, the ambient brightness value detected after the lamp is switched on, the ambient brightness value detected before the lamp is switched on, the preset LUX value, a fixed compensation LUX value, and a coefficient, calculating the switching-off LUX value automatically, and controlling, according to the switching-off LUX value, the drive module 13 to switch off the load lamp, where the switching-off LUX value=(preset LUX value+lamp light value+fixed compensation LUX value)*first coefficient, the lamp light value is a difference value between the ambient brightness value detected after the lamp is switched on and the ambient brightness value detected before the lamp is switched on, and the first coefficient is greater than 1. The first coefficient is used to enable a hysteresis between the switching-off LUX value and a switching-on LUX value, and the hysteresis becomes larger proportional to change of a preset switching-on LUX value and the lamp light value, so as to accurately prevent spectral change of the natural light in different time periods and jitter of the lamp light value from affecting determining a critical point of the switching-on LUX value. Preferably, a value range of the first coefficient is 1.1-1.8.

Figure 2:
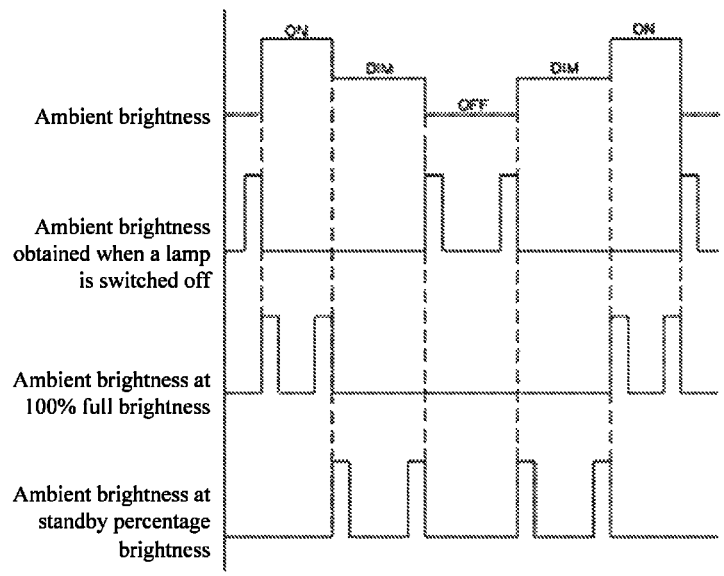
FIG. 2 is a schematic implementation diagram of a sensor with a three-section dimming function according to Embodiment 1 of the present invention.

A third manner aims at a sensor with a three-section dimming function. The MCU control module 14 needs to acquire two switching-off LUX values: one is a first switching-off LUX value at 100% full brightness, and another is a second switching-off LUX value at standby percentage brightness. The standby percentage brightness is defined as a preset ratio of a lamp light value at 100% full brightness. Preferably, a value range of the preset ratio is 1% ~50%. The preset LUX value is an ambient brightness switching-on value preset by using a DIP switch or a rotary switch, and the standby lamp light value is a difference value between an ambient brightness value detected when the lamp is at standby brightness and the ambient brightness value detected before the lamp is switched on. The first switching-off LUX value=preset LUX value+lamp light value at 100% full brightness+fixed compensation LUX value; the second switching-off LUX value=preset LUX value+standby lamp light value+fixed compensation LUX value; or, the first switching-off LUX value=(preset LUX value+lamp light value at 100% full brightness+fixed compensation LUX value)*coefficient; the second switching-off LUX value=(preset LUX value+standby lamp light value+fixed compensation LUX value)*coefficient. When the sensor enters the standby percentage brightness from 100% full brightness, as shown in FIG. 2, if external ambient brightness is greater than the switching-off LUX value, the load lamp is directly OFF; if external ambient brightness is less than the switching-off LUX value, the load lamp enters a standby state. After the load lamp enters the standby state, the load lamp is switched off for 2 s every 30 min, a time length of which may be set freely, such as 10 min or 1h; an ambient brightness value is detected when the load lamp is OFF, and when the ambient brightness value detected when the load lamp is OFF is greater than the preset LUX value, the load lamp is switched off automatically, so as to achieve an objective of energy saving.

Further, the sensor is also connected to a power supply module. An output end of the power supply module is separately connected to the drive module 13 and the MCU control module 14, and configured to provide voltage input for the drive module 13 and the MCU control module 14.

In this embodiment, a switching-off LUX point is set automatically according to brightness detection, and a function of automatically switching off a load driving lamp is implemented, and energy consumption is effectively reduced.

Embodiment 2

Figure 3:
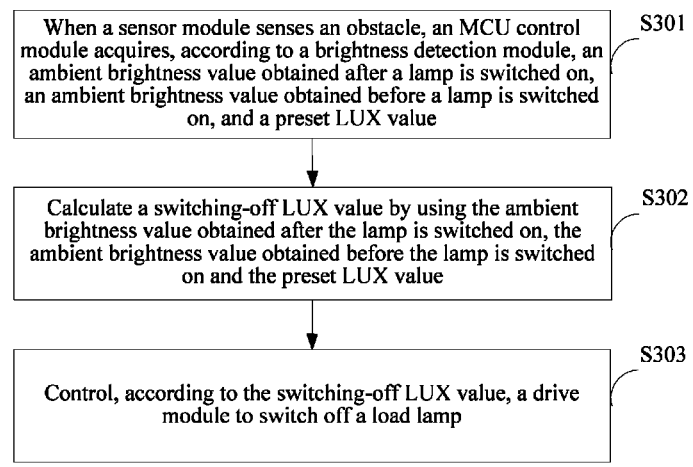
FIG. 3 is an implementation flowchart of a method for switching off according to Embodiment 2 of the present invention.

FIG. 3 shows an implementation process of a method for switching off according to Embodiment 2 of the present invention, and detailed descriptions are as follows:

In step S301, when a sensor module senses an obstacle, an MCU control module acquires, according to a brightness detection module, an ambient brightness value detected after a lamp is switched on, an ambient brightness value detected before a lamp is switched on, and a preset LUX value.

In this embodiment, the sensor module 12 is specifically any one of a microwave sensor, an infrared sensor and an acoustic wave sensor. The preset LUX value is specifically an ambient brightness switching-on value preset by using a DIP switch or a rotary switch.

In step S302, a switching-off LUX value is calculated by using the ambient brightness value detected after the lamp is switched on, the ambient brightness value detected before the lamp is switched on and the preset LUX value.

In this embodiment, there are three manners for the MCU control module to calculate the switching-off LUX value by using the ambient brightness value detected after the lamp is switched on, the ambient brightness value detected before the lamp is switched on and the preset LUX value.

A first manner is: acquiring, by the MCU control module according to the brightness detection module, the ambient brightness value detected after the lamp is switched on, the ambient brightness value detected before the lamp is switched on, the preset LUX value, and a fixed compensation LUX value, calculating the switching-off LUX value automatically, and controlling, according to the switching-off LUX value, the drive module to switch off the load lamp, where the switching-off LUX value=preset LUX value+ lamp light value+fixed compensation LUX value, and the lamp light value is a difference value between the ambient brightness value detected after the lamp is switched on and the ambient brightness value detected before the lamp is switched on.

A second manner is: acquiring, by the MCU control module according to the brightness detection module, the ambient brightness value detected after the lamp is switched on, the ambient brightness value detected before the lamp is switched on, the preset LUX value, a fixed compensation LUX value, and a coefficient, calculating the switching-off LUX value automatically, and controlling, according to the switching-off LUX value, the drive module to switch off the load lamp, where the switching-off LUX value=(preset LUX value+lamp light value+fixed compensation LUX value)*coefficient, the lamp light value is a difference value between the ambient brightness value detected after the lamp is switched on and the ambient brightness value detected before the lamp is switched on, and the coefficient is greater than 1.

A third manner is: acquiring, by the MCU control module, a first switching-off LUX value at 100% full brightness and a second switching-off LUX value at standby percentage brightness, where the standby percentage brightness is defined as a preset ratio of a lamp light value at 100% full brightness, and a standby lamp light value is a difference value between an ambient brightness value detected when the lamp is at standby brightness and the ambient brightness value detected before the lamp is switched on; where the first switching-off LUX value=preset LUX value+lamp light value at 100% full brightness+fixed compensation LUX value; the second switching-off LUX value=preset LUX value+standby lamp light value+fixed compensation LUX value; or, the first switching-off LUX value=(preset LUX value+lamp light value at 100% full brightness+fixed compensation LUX value)*coefficient; the second switching-off LUX value=(preset LUX value+standby lamp light value+ fixed compensation LUX value)*coefficient.

In step S303, a drive module is controlled, according to the switching-off LUX value, to switch off a load lamp.

In this embodiment, a switching-off LUX point is set automatically according to brightness detection, and a function of automatically switching off a load driving lamp is implemented, and energy consumption is effectively reduced.

The method for switching off provided in this embodiment of the present invention may be applied in the foregoing Embodiment 1 of a corresponding device. For details, refer to descriptions of the foregoing Embodiment 1, and no further details are provided herein again.

It should be noted that in the foregoing system embodiments, the units included are only divided according to functional logic, but are not limited to the foregoing division, as long as corresponding functions can be implemented; besides, specific names of the units are also only used for distinguishing the units conveniently, but are not used to limit the protection scope of the present invention.

In addition, a person of ordinary skill in the art may understand that all or some of the steps in the methods of the foregoing embodiments may be implemented by a program instructing relevant hardware. The corresponding program may be stored in a computer readable storage medium. The storage medium is a ROM/RAM, a magnetic disk, an optical disc, or the like.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A sensor with a LUX off function, comprising: a brightness detection module, a sensor module, an MCU (Micro Controller Unit) control module and a drive module, wherein an output end of the brightness detection module is connected to an input end of the MCU control module, an output end of the sensor module is connected to the input end of the MCU control module, an output end of the MCU control module is connected to an input end of the drive module, and when the sensor module senses an obstacle, the MCU control module acquires, according to the brightness detection module, an ambient brightness value detected after a lamp is switched on, an ambient brightness value detected before a lamp is switched on, and a preset LUX value, calculates a switching-off LUX value automatically, and controls, according to the switching-off LUX value, the drive module to switch off a load lamp.

2. The sensor according to claim 1, wherein the preset LUX value is specifically an ambient brightness switching-on value preset by using a DIP switch or a rotary switch.

3. The sensor according to claim 1, wherein the brightness detection module is formed by a light sensitive device, and configured to convert an optical signal to an analog electrical signal, and output the analog electrical signal to an A/D input port of the MCU control module, wherein the light sensitive device comprises a photodiode, a phototriode, or an optical resistor.

4. The sensor according to claim 1, wherein the MCU control module is configured to: acquire, according to the brightness detection module, the ambient brightness value detected after the lamp is switched on, the ambient brightness value detected before the lamp is switched on, the preset LUX value, and a fixed compensation LUX value, calculate the switching-off LUX value automatically, and control, according to the switching-off LUX value, the drive module to switch off the load lamp, wherein the switching-off LUX value=preset LUX value+lamp light value+fixed compensation LUX value, and the lamp light value is a difference value between the ambient brightness value detected after the lamp is switched on and the ambient brightness value detected before the lamp is switched on.

5. The sensor according to claim 1, wherein the MCU control module is further configured to: acquire, according to the brightness detection module, the ambient brightness value detected after the lamp is switched on, the ambient brightness value detected before the lamp is switched on, the preset LUX value, a fixed compensation LUX value, and a coefficient, calculate the switching-off LUX value automatically, and control, according to the switching-off LUX value, the drive module to switch off the load lamp, wherein the switching-off LUX value=(preset LUX value+lamp light value+fixed compensation LUX value)*coefficient, the lamp light value is a difference value between the ambient brightness value detected after the lamp is switched on and the ambient brightness value detected before the lamp is switched on, and the coefficient is greater than 1.

6. The sensor according to claim 1, wherein the MCU control module is further configured to acquire a first switching-off LUX value at 100% full brightness and a second switching-off LUX value at standby percentage brightness, wherein the standby percentage brightness is defined as a preset ratio of a lamp light value at 100% full brightness, and a standby lamp light value is a difference value between an ambient brightness value detected when the lamp is at standby brightness and the ambient brightness value detected before the lamp is switched on; wherein the first switching-off LUX value=preset LUX value+lamp light value at 100% full brightness+fixed compensation LUX value; and the second switching-off LUX value=preset LUX value+standby lamp light value+fixed compensation LUX value.

7. The sensor according to claim 6, wherein the first switching-off LUX value=(preset LUX value+lamp light value at 100% full brightness+fixed compensation LUX value)*coefficient; and the second switching-off LUX value=(preset LUX value+standby lamp light value+fixed compensation LUX value)*coefficient.

8. A method for switching off, wherein the method for switching off comprises:
when a sensor module senses an obstacle, acquiring, by an MCU (Micro Controller Unit) control module according to a brightness detection module, an ambient brightness value detected after a lamp is switched on, an ambient brightness value detected before a lamp is switched on, and a preset LUX value;
calculating a switching-off LUX value by using the ambient brightness value detected after the lamp is switched on, the ambient brightness value detected before the lamp is switched on and the preset LUX value; and
controlling, according to the switching-off LUX value, a drive module to switch off a load lamp.

9. The method for switching off according to claim 8, wherein the preset LUX value is specifically an ambient brightness switching-on value preset by using a DIP switch or a rotary switch.

10. The method for switching off according to claim 8, wherein the calculating, by the MCU control module, a switching-off LUX value by using the ambient brightness value detected after the lamp is switched on, the ambient brightness value detected before the lamp is switched on and the preset LUX value specifically comprises:
acquiring, according to the brightness detection module, the ambient brightness value detected after the lamp is switched on, the ambient brightness value detected before the lamp is switched on, the preset LUX value, and a fixed compensation LUX value, calculating the switching-off LUX value automatically, and controlling, according to the switching-off LUX value, the drive module to switch off the load lamp, wherein the switching-off LUX value=preset LUX value+lamp light value+fixed compensation LUX value, and the lamp light value is a difference value between the ambient brightness value detected after the lamp is switched on and the ambient brightness value detected before the lamp is switched on;
acquiring, according to the brightness detection module, the ambient brightness value detected after the lamp is switched on, the ambient brightness value detected before the lamp is switched on, the preset LUX value, a fixed compensation LUX value, and a coefficient, calculating the switching-off LUX value automatically, and controlling, according to the switching-off LUX value, the drive module to switch off the load lamp, wherein the switching-off LUX value=(preset LUX value+lamp light value+fixed compensation LUX value)*coefficient, the lamp light value is a difference value between the ambient brightness value detected after the lamp is switched on and the ambient brightness value detected before the lamp is switched on, and the coefficient is greater than 1; or
acquiring a first switching-off LUX value at 100% full brightness and a second switching-off LUX value at standby percentage brightness, wherein the standby percentage brightness is defined as a preset ratio of a lamp light value at 100% full brightness, and a standby lamp light value is a difference value between an ambient brightness value detected when the lamp is at standby brightness and the ambient brightness value detected before the lamp is switched on; wherein the first switching-off LUX value=preset LUX value+lamp light value at 100% full brightness+fixed compensation LUX value; the second switching-off LUX value=preset LUX value+standby lamp light value+fixed compensation LUX value; or, the first switching-off LUX value=(preset LUX value+lamp light value at 100% full brightness+fixed compensation LUX value)*coefficient; the second switching-off LUX value=(preset LUX value+standby lamp light value+fixed compensation LUX value)*coefficient.

* * * * *